Feb. 26, 1935. B. HATCHEL 1,992,425
GAUGE GLASS
Filed Feb. 24, 1932
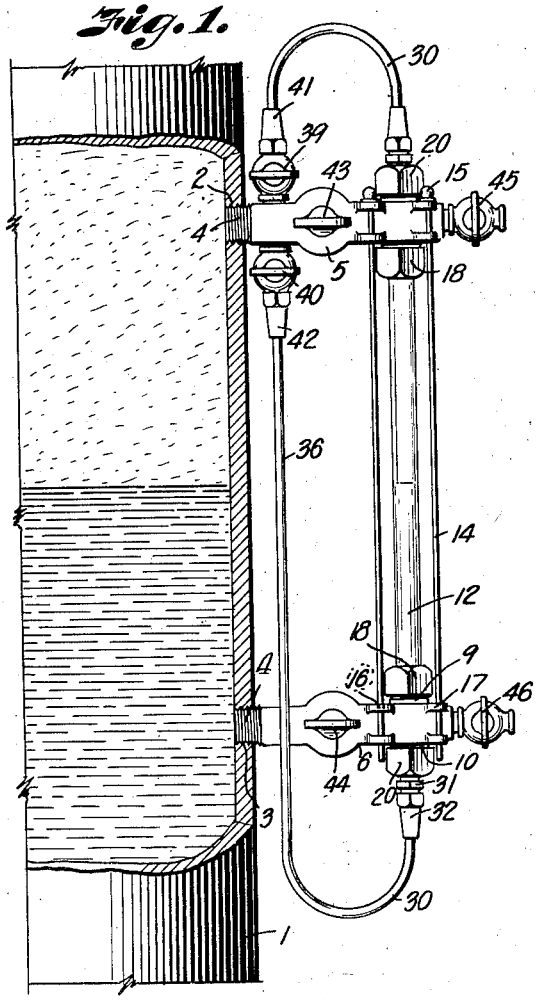
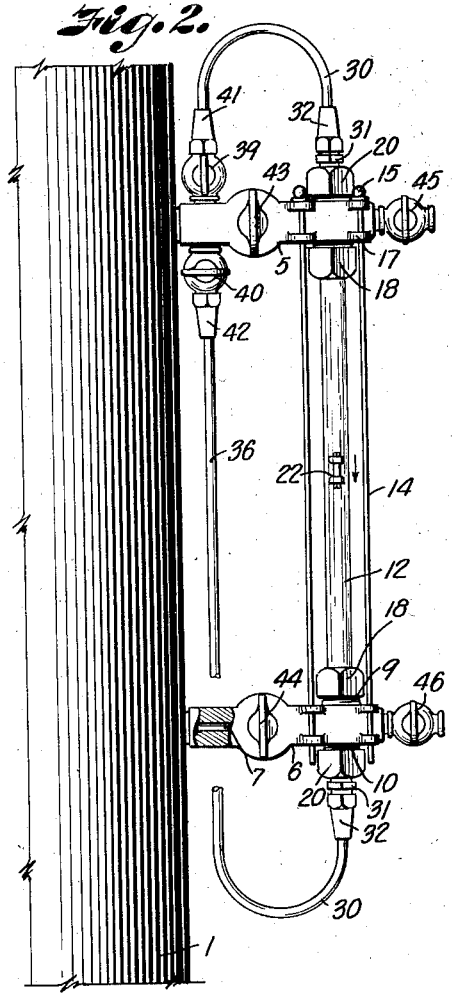
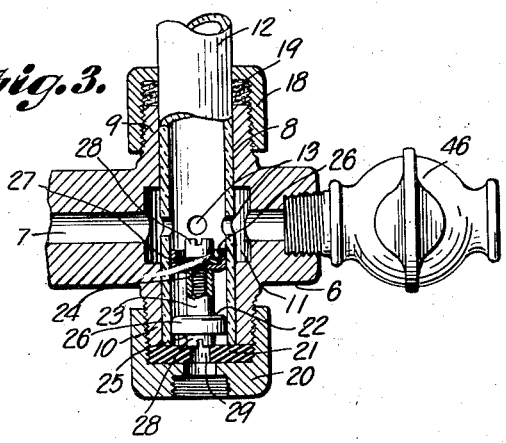
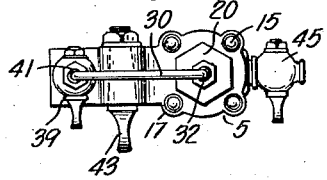
INVENTOR.
Byrd Hatchel
BY
ATTORNEY.

Patented Feb. 26, 1935

1,992,425

UNITED STATES PATENT OFFICE 1,992,425

GAUGE GLASS

Byrd Hatchel, Oklahoma City, Okla.

Application February 24, 1932, Serial No. 594,765

15 Claims. (Cl. 73—54)

My invention relates to sight gauges and more particularly to a device for cleaning gauges of this character.

The principal objects of my invention are to provide means for utilizing the pressure of fluid communicating with a sight gauge for cleaning the glass of the gauge, and to effect such a cleaning operation without removing the glass from the gauge fittings.

A further object of the invention is to provide a simple device of this character that will not interfere with the accuracy and serviceability of the gauge.

In accomplishing these and other objects of the invention, I have provided improved details of structure, the preferred form of which is disclosed in the accompanying drawing, wherein:

Fig. 1 is an elevational view of a sight gauge mounted on a tank, shown fragmentarily, and provided with cleaning mechanism embodying my invention.

Fig. 2 is a similar view showing the position of the valves of the cleaning device to effect downward movement of the cleaning piston through the gauge glass.

Fig. 3 is an enlarged fragmentary view of the lower chamber member shown in central section and illustrating the position of the cleaning piston in the glass.

Fig. 4 is a plan view of the gauge and cleaning mechanism.

Referring more in detail to the drawing:

1 designates a portion of a tank having upper and lower internally threaded openings 2 and 3 for respectively receiving exteriorly threaded nipples 4 of chamber members 5 and 6 respectively.

Each of the chamber members is provided with a longitudinal port 7, communicating with the interior of the tank, and intersected by a vertical opening 8 extended through nipples 9 and 10 projecting laterally from the chamber members.

The portions of the openings 8 adjacent the port 7 are counter-bored, as shown at 11, for admitting fluid pressure around the entire periphery of a gauge glass 12 having opposite ends mounted in the openings 8 of the respective upper and lower chamber members, and a circular series of ports 13 are provided in the gauge glass adjacent each end and in substantial alignment with the ports 7 for admitting liquid and gas from the tank into the opposite ends of the glass.

A plurality of rods 14 having heads 15 are extended through aligned openings 16 of ears 17 formed integrally with the upper and lower chamber members for protecting the gauge glass in the ordinary manner, and packing nuts 18 are threaded on the nipples 9 for urging packing material 19 into intimate contact with the gauge glass to seal the glass in the opening 8.

Similar packing nuts 20 are threaded on the nipples 10 to urge bumpers 21, preferably formed of resilient or yieldable material, against the ends of the gauge glass and the nipples 10 to seal the ends and to further serve for limiting movement of a cleaning piston 22 reciprocably mounted in the gauge glass.

Although any suitable type of plunger may be employed for this purpose, the plunger I have shown comprises a cylindrical body 23 threaded internally for receiving the threaded ends 24 of cap screws 25 serving to clamp oppositely directed cups 26 against the ends of the cylindrical body, washers 27 being mounted between the cups and the heads 28 of the screws.

As will be clear from Fig. 3, the bumpers are provided with concentric openings 29 to communicate the gauge glass with U-shaped by-pass tubes 30 secured to both the upper and lower chamber members by nipples 31 threaded into the packing nuts 20 and connected to the tubes by couplings 32.

Inter-connection of the by-pass tubes provided on the upper and lower ends of the gauge glass is effected by an extension 36 of the lower by-pass tube 30 in parallel relation with the gauge glass. Valves or stop-cocks 39 and 40 are threaded into opposite faces of the upper chamber member and are respectively connected by couplings 41 and 42 to the upper by-pass tube and to the connecting tube extension 36, and similar stop-cocks or valves 43 and 44 are mounted in the portions of the upper and lower chamber members intermediate the connecting tube and gauge glass to control the flow of gas and liquid to the glass.

Valves 45 and 46 are further threaded into the extreme outer ends of the upper and lower chamber members for testing purposes in accordance with common practice and for venting the gauge glass to permit the piston to reciprocate under the conditions hereinafter described.

Assuming the gauge to be constructed and assembled as described, the operation thereof would be as follows:

With the valves in the position indicated in Fig. 1, both gas and liquid are free to enter the gauge glass through the fittings 5 and 6, but not through the by-pass 30, 36, 30 and the liquid will rise in the glass to a level corresponding with the level of liquid in the tank. Should the interior of the glass become cloudy, or a film collect on the interior thereof, due to sediment in the liquid in the tank, or for other reasons, it may be readily cleaned by reciprocating the plunger or piston through the glass which is accomplished in the following manner:

If the piston is located at the upper end of the glass, it may be moved downwardly by closing the valves 40, 43 and 44 and opening valve 39 and the lower vent valve 46 (Fig. 2). Gas under pressure in the tank is then free to flow through the upper by-pass tube into engagement with the upper end of the piston for forcing the piston downwardly in the glass to its lower limit of travel. If further cleaning of the glass is required, the valves 39 and 46 are closed and the valves 40 and 45 opened, thereby causing the gas to travel downwardly through the connecting tube extension 36 and through the lower by-pass tube into contact with the lower end of the piston for elevating the piston to its upper limit of travel.

It will be obvious that these operations may be repeated until the gauge glass has been properly cleaned, whereupon both by-pass valves 39 and 40 and both vent valves 45 and 46 are again closed and the valves 43 and 44 opened to permit the liquid to assume a level in the gauge glass corresponding to that in the tank.

From the foregoing, it will be apparent that I have provided a very simple and practical mechanism for cleaning a gauge glass without removing the glass from its fittings, thereby eliminating the danger of breaking the glass.

What I claim and desire to secure by Letters Patent is:

1. A device of the character described including upper and lower fittings adapted for connection with a receptacle for fluid under pressure, a gauge glass mounted in said fittings, valves adapted for controlling communication between the tank and glass through said fittings, selectively operable vent cocks for said fittings, a piston movable in the glass, and means for selectively by-passing fluid from the upper fitting about said valves to opposite ends of the glass.

2. A device of the character described including upper and lower fittings adapted for connection with a receptacle for fluid under pressure, a gauge glass mounted in said fittings, valves adapted for controlling communication between the tank and glass through said fittings, selectively operable vent cocks for said fittings, a piston movable in the glass, means for selectively by-passing fluid from the upper fitting about said valves to opposite ends of the glass, and bumpers at opposite ends of the glass for limiting travel of the piston.

3. In a device of the character described, upper and lower chamber members having channels communicating with a source of fluid, a vertical gauge glass having opposite ends extended into said members and having lateral ports in communication with the channels, a conduit leading from one of the channels and opening into opposite ends of the glass, a cleaning piston reciprocable in the glass, means for selectively venting said chambers, and valves in the conduit and in said channels for controlling flow of fluid to opposite ends of the piston.

4. A device of the character described including spaced fittings adapted for connection with a receptacle respectively above and below a liquid level in the receptacle, a gauge glass mounted in said fittings, a piston in the gauge glass a by-pass line leading from one of the fittings to opposite ends of the gauge glass, means for selectively venting the fittings, and means for selectively directing flow through the by-pass.

5. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively venting the fittings and means for selectively directing flow through the by-pass, including valves in the by-pass at opposite sides of said fitting.

6. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively directing flow through the by-pass, including valves in the by-pass at opposite sides of said fitting, means for selectively venting the fittings, and a piston reciprocable in the gauge glass in response to pressure of fluid admitted to the glass through said by-pass.

7. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively venting the fittings and means for selectively directing flow through the by-pass, including valves in the fittings between the by-pass and gauge glass.

8. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively directing flow through the by-pass including valves in the fittings between the by-pass and gauge glass, means for selectively venting the fittings and a piston reciprocable in the gauge glass in response to pressure of fluid admitted to the glass through said by-pass.

9. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively directing flow through the by-pass, including supply and vent valves in the fittings at opposite sides of the gauge glass, and a piston reciprocable in the gauge glass in response to pressure of fluid admitted to the glass through said by-pass.

10. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively directing flow through the by-pass, including valves in the by-pass at opposite sides of said fitting, means for selectively venting the fittings and valves in the fittings controlling direct flow from the receptacle through the fittings to the gauge glass.

11. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively directing flow through the by-pass, including valves in the by-pass at opposite sides of said fitting, valves in the fittings controlling direct flow from the receptacles through the fittings to the gauge glass, and vent valves in the fittings.

12. A device of the character described including spaced fittings adapted for connection with a receptacle respectively above and below a liquid level in the receptacle, a gauge glass mounted in said fittings, a by-pass line leading from one of the fittings to opposite ends of the gauge glass, means for selectively directing flow through the by-pass, including valves in the by-pass at opposite sides of said fitting, valves in the fittings controlling direct flow from the receptacles through the fittings to the gauge glass, vent valves in the fittings, and a piston reciprocable in the gauge glass in response to pressure of fluid admitted to the glass through said by-pass.

13. A device of the character described including spaced fittings adapted for connection with a receptacle respectively above and below a liquid level in the receptacle, a gauge glass mounted in said fittings, by-pass lines having connections with one of the fittings and with opposite ends of the glass, valves in the by-pass lines at opposite sides of said fitting, means for selectively venting the fittings and valves in the fittings, the valve in the fitting having the by-pass lines being located between the by-pass connections and the gauge glass.

14. A device of the character described including spaced fittings adapted for connection with a receptacle respectively above and below a liquid level in the receptacle, a gauge glass mounted in said fittings, by-pass lines having connections with one of the fittings and with opposite ends of the glass, valves in the by-pass lines at opposite sides of said fitting, valves in the fittings, the valve in the fitting having the by-pass lines being located between the by-pass connections and the gauge glass, valves in the fittings for selectively venting opposite ends of the glass, and a piston reciprocable in the gauge glass in response to pressure of fluid admitted to the glass through said by-pass lines.

15. A device of the character described including spaced fittings having flow channels therein, a transparent pipe section having ends mounted in said fittings, a piston slidable in the pipe section to remove sediment which tends to collect therein, means connecting the flow channels with the pipe section intermediate the ends thereof to form piston chambers therein out of the path of normal flow therethrough, valves for controlling flow through the pipe section, means for venting opposite ends of the pipe section, and means for applying fluid pressure to opposite sides of the piston whereby the piston is reciprocated in the pipe section.

BYRD HATCHEL.